Patented June 6, 1950

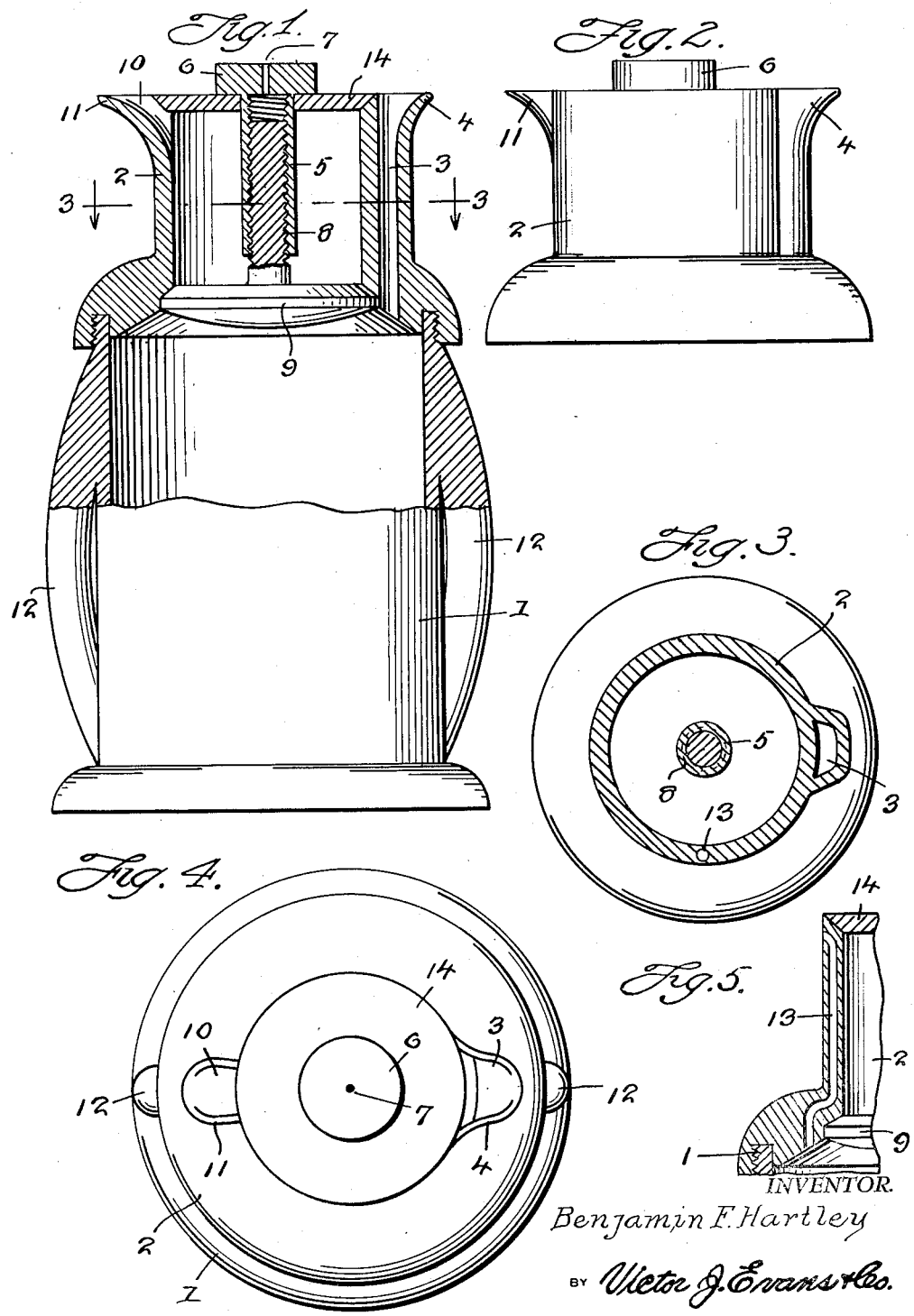

2,510,104

UNITED STATES PATENT OFFICE 2,510,104

MILK BOTTLE

Benjamin F. Hartley, Los Angeles, Calif.; Lladona M. Hartley administratrix of said Benjamin F. Hartley, deceased Application January 21, 1947, Serial No. 723,405

1 Claim. (Cl. 210—51.5)

This invention relates to improvements in containers, and more particularly to the provision of a container especially adapted for use with liquids which have light matter and heavy matter which separate upon standing, such as milk.

It is an object of the invention to provide a container for milk, which container has a compartment for holding cream separated from the milk upon standing.

A further object is to provide a container from which either milk or cream can be poured without interference. By means of the device herein described, the work of preparing and serving a breakfast is lessened, and by using a single container for dispensing cream and milk, a breakfast can be more conveniently served.

These and other objects are attained by the novel construction and arrangement of parts hereinafter described and illustrated by the accompanying drawings, forming a part hereof, and in which:

Fig. 1 is a sectional view of a container embodying the invention.

Fig. 2 is a side view of the upper portion of the container.

Fig. 3 is a sectional view taken on the line 3—3 of Fig. 1.

Fig. 4 is a top view of the device.

Fig. 5 is a sectional view of a portion of the container showing a vent.

Referring to the drawings, the container is shown to comprise a main body 1, adapted to hold milk or the like. The main body 1 is threadedly connected to an upper compartment 2, which has a passage 3 in a wall thereof, communicating with the main body 1. Milk can be poured through the passage 3, at the upper end thereof there being a lip 4.

An upper valve 14 for compartment 2 has passing therethrough an internally threaded tube 5, having connected to the upper end thereof a knurled knob 6 with a drain hole 7.

The tube 5 threadedly engages a stem 8 of a valve 9. By rotating the knob 6 the lower valve 9 is raised or lowered.

Cream is poured from the compartment 2 through the passage 10 at the upper end of which is a lip 11. The main body 1 is provided with handles 12.

In operation, whole milk is poured into the main body 1 and the lower valve 9 lowered by rotating the knurled knob.

The milk is allowed to stand over night, and during that time the cream will separate and rise into the compartment 2 through the open valve 9. In the morning, the valve 9 is raised and closed to hold the cream separate from the milk. The milk can now be poured through the passage 3, and the cream through the passage 10 without interfering with each other.

If so desired, the compartment 2 can be unscrewed from the main body 1 and used as a separate container. The container can be made in any size and shape, and can be made of metal, ceramics, glass, plastics and the like.

In the wall of compartment 2 is a vent 13 which communicates with the main body 1. (See Fig. 5.)

The above description is to be considered as illustrative and not limitative of the invention of which modifications can be made without departing from the spirit and scope as set forth in the appended claim.

The invention having been described, what is claimed is:

In a container, the combination of a main body member having a threaded portion, a compartment having an upper and a lower opening, a pouring passage being formed in said upper opening, threaded means on said compartment for receiving the threaded portion on said main body member for attachment thereto, a removable upper valve plate closing said upper opening except for said pouring passage, a removable lower valve plate adapted to close said lower opening, a threaded stem attached to said lower valve plate, an internally threaded sleeve member rotatably supported by said upper valve plate and threadedly receiving said stem, and means on said compartment forming externally thereof a passageway between the atmosphere and the interior of said main body member for dispensing fluid therefrom independently of said compartment openings.

BENJAMIN F. HARTLEY.

REFERENCES CITED

The following references are of record in the file of this patent:

UNITED STATES PATENTS

| Number | Name | Date |
|---|---|---|
| 842,086 | Dixon | Jan. 22, 1907 |
| 1,078,175 | Splaine | Nov. 11, 1913 |
| 2,075,664 | Scheemaeker | Mar. 30, 1937 |
| 2,331,426 | Scheemaeker | Oct. 12, 1943 |

FOREIGN PATENTS

| Number | Country | Date |
|---|---|---|
| 28,548 | Great Britain | A. D. 1906 |